(12) United States Patent
Snyder et al.

(10) Patent No.: US 10,214,668 B2
(45) Date of Patent: Feb. 26, 2019

(54) ADHESIVE COMPOSITION AND ARTICLE INCLUDING THE SAME

(71) Applicant: ND Industries, Inc., Clawson, MI (US)

(72) Inventors: Desiree Nicole Snyder, Metamora, MI (US); Christopher T. Hable, Romeo, MI (US)

(73) Assignee: ND Industries, Inc., Clawson, MI (US)

( * ) Notice: Subject to any disclaimer, the term of this patent is extended or adjusted under 35 U.S.C. 154(b) by 149 days.

(21) Appl. No.: 14/847,044

(22) Filed: Sep. 8, 2015

(65) Prior Publication Data

US 2016/0068726 A1 Mar. 10, 2016

Related U.S. Application Data

(60) Provisional application No. 62/047,279, filed on Sep. 8, 2014.

(51) Int. Cl.
| | | |
|---|---|---|
| *B32B 27/38* | (2006.01) | |
| *B32B 27/26* | (2006.01) | |
| *F16B 39/22* | (2006.01) | |
| *C08G 59/32* | (2006.01) | |
| *C08G 59/50* | (2006.01) | |
| *C09J 163/04* | (2006.01) | |
| *C09J 179/02* | (2006.01) | |
| *C09J 163/00* | (2006.01) | |
| *B05D 3/02* | (2006.01) | |
| *C08G 59/18* | (2006.01) | |
| *C08G 59/40* | (2006.01) | |
| *C08G 59/62* | (2006.01) | |
| *C08L 79/00* | (2006.01) | |
| *B32B 15/092* | (2006.01) | |

(52) U.S. Cl.
CPC .......... *C09J 179/02* (2013.01); *B05D 3/0272* (2013.01); *C08G 59/188* (2013.01); *C08G 59/4021* (2013.01); *C08G 59/504* (2013.01); *C08G 59/623* (2013.01); *C08L 79/00* (2013.01); *C09J 163/00* (2013.01); *F16B 39/225* (2013.01); *C09J 2463/003* (2013.01); *C09J 2479/023* (2013.01)

(58) Field of Classification Search
None
See application file for complete search history.

(56) References Cited

U.S. PATENT DOCUMENTS

| | | | |
|---|---|---|---|
| 3,395,105 A | | 7/1968 | Washburn et al. |
| 3,657,379 A | * | 4/1972 | Hilbelink et al. ...... C08G 59/18 156/327 |
| 3,746,068 A | | 7/1973 | Deckert et al. |
| 4,226,969 A | * | 10/1980 | Watson, Jr. ............ C08G 59/50 156/330 |
| 5,426,130 A | | 6/1995 | Thurber et al. |
| 5,651,824 A | | 7/1997 | Wallace et al. |
| 5,656,325 A | | 8/1997 | Wallace |
| 5,672,376 A | | 9/1997 | Wallace |
| 5,679,160 A | | 10/1997 | Wallace et al. |
| 5,928,711 A | | 7/1999 | Wallace et al. |
| 5,964,551 A | | 10/1999 | Wallace |
| 6,027,568 A | | 2/2000 | Wallace et al. |
| 6,270,838 B1 | | 8/2001 | Wallace et al. |
| 6,322,628 B1 | | 11/2001 | Wallace |
| 6,474,919 B2 | | 11/2002 | Wallace et al. |
| 6,817,816 B2 | | 11/2004 | Hill |
| 7,404,483 B2 | | 7/2008 | Wallace |
| 7,521,402 B2 | | 4/2009 | Combetta |
| 7,771,148 B2 | | 8/2010 | Phillips |
| 7,772,316 B2 | | 8/2010 | Barr |
| 7,878,744 B2 | | 2/2011 | Snow et al. |
| 8,865,794 B2 | | 10/2014 | Wallace et al. |
| 8,865,812 B2 | | 10/2014 | Phillips |
| 2004/0258922 A1 | | 12/2004 | Willett et al. |
| 2007/0191512 A1 | * | 8/2007 | Bigorra Llosas .... C08G 59/182 523/402 |

(Continued)

FOREIGN PATENT DOCUMENTS

| | | |
|---|---|---|
| CA | 2632482 A1 | 11/2008 |
| EP | 0063475 A1 | 10/1982 |
| EP | 0477440 A1 | 4/1992 |
| WO | WO98/17724 A1 | 4/1998 |
| WO | WO99/66219 A1 | 12/1999 |
| WO | WO2004/000964 A1 | 12/2003 |
| WO | WO2008/073262 A1 | 6/2008 |
| WO | WO2008/094535 A1 | 8/2008 |
| WO | WO2008/094537 A2 | 8/2008 |
| WO | WO2008/153866 A1 | 12/2008 |
| WO | WO2008/153868 A1 | 12/2008 |

OTHER PUBLICATIONS

PCT/US2015/048794 International Search Report dated Nov. 30, 2015, 5 pages.

*Primary Examiner* — Michael J Feely
(74) *Attorney, Agent, or Firm* — Warner Norcross & Judd LLP

(57) ABSTRACT

An adhesive composition ("composition") comprises an epoxy resin, a binder, and a curing agent. Typically, the composition further comprises an aqueous solvent (e.g. water) such that the composition can be referred to as an aqueous adhesive composition. The epoxy resin is typically encapsulated to prevent premature cure of the composition. After rupture of the encapsulated epoxy resin, the composition cures to form an adhesive. The composition is useful for articles such as fasteners (e.g. nuts and bolts) such that it can be referred to as a fastener adhesive. Typically, the composition is disposed on a threaded surface of the fastener. The fastener can be used for an assembly in which the composition generally cures after installation of the fastener. To make the fastener, the adhesive composition can be applied on the threaded surface. After application, the composition can be dried in instances where the composition still includes the aqueous solvent.

18 Claims, No Drawings

(56) References Cited

U.S. PATENT DOCUMENTS

| | | |
|---|---|---|
| 2008/0292426 A1 | 11/2008 | Snow et al. |
| 2014/0199135 A1 | 7/2014 | Hable et al. |
| 2015/0014126 A1 | 1/2015 | Snow |
| 2015/0056394 A1 | 2/2015 | Rawls |
| 2015/0232692 A1 | 8/2015 | Snyder et al. |

\* cited by examiner

ADHESIVE COMPOSITION AND ARTICLE INCLUDING THE SAME

CROSS-REFERENCE TO RELATED APPLICATIONS

This application claims priority to and all advantages of U.S. Patent Application No. 62/047,279 filed on 8 Sep. 2014, the content of which is hereby incorporated by reference.

FIELD OF THE INVENTION

The present invention generally relates to an adhesive composition, and, more specifically, to an adhesive composition useful for coating articles (e.g. fasteners), to an adhesive formed from the adhesive composition, and to an article including the adhesive composition (e.g. a coated fastener). The present invention also relates to a method of making the adhesive composition and to a method of making the article. The adhesive formed by curing the adhesive composition has excellent adhesive strength.

DESCRIPTION OF THE RELATED ART

Adhesive compositions and adhesives formed by curing adhesive compositions are known in the art and utilized in a variety of industries. For example, adhesives are commonly utilized to bond (or adhere) two adjacent layers or substrates to one another. There are a variety of different types of adhesives based on desired physical properties, the end use of the adhesive, and materials of the substrates to be joined.

Adhesive compositions have long been used to coat fasteners (e.g. screws, bolts, nuts, etc.). Such adhesive compositions are often referred to as fastener adhesives. Fastener adhesives are used, for example, to prevent bolt-and-nut assemblies from loosening due to application of stress, vibration, exposure to chemicals, etc.

Conventional fastener adhesives may contain a combination of microencapsulated epoxy resin and an amine curative. The microcapsule shell wall prevents the epoxy resin from prematurely reacting with the amine curative until a desired time of use. When the coated fastener is installed, shear force ruptures the microcapsules and mixes the epoxy resin with the amine curative, allowing for reaction to occur between the epoxy resin and amine curative. Once reaction is initiated, the adhesive composition typically cures over a period of several hours or days; however, heating can accelerate the rate of cure.

A majority of conventional fastener adhesives use an organic solvent as a carrier for necessary components of the adhesive composition. After coating the fastener with the adhesive composition, the organic solvent is removed by a drying process. Unfortunately, undesirable volatile organic components ("VOCs") are released into the environment during the drying process. VOCs can present flammability and health concerns when utilized in this manner.

The issues above may be addressed by replacing the organic solvent with water. However, utilizing water as the carrier presents limitations regarding the necessary adhesive components that may be utilized to form the adhesive composition.

In view of the foregoing, there remains an opportunity to provide adhesive compositions with increased formulation versatility, stability, and physical properties. There also remains an opportunity to provide improved adhesives and articles including such adhesive compositions (e.g. improved coated fasteners).

BRIEF SUMMARY OF THE INVENTION

Disclosed is an adhesive composition. The adhesive composition comprises an epoxy resin, a binder, and a curing agent different from the binder. Optionally, the adhesive composition further comprises an aqueous solvent (e.g. while in a wet or liquid form). At least one of the epoxy resin or curing agent is encapsulated. The adhesive composition is especially useful for coating articles, such as threaded fasteners.

Also disclosed is an article. The article comprises a substrate having a surface. The adhesive composition is disposed on the surface. The article can be a fastener having a threaded surface. As such, the article may be a coated fastener. Further disclosed is an assembly including the article.

A method of making the article is disclosed. The method comprises the steps of providing the adhesive composition and applying the adhesive composition to the surface of the substrate. Optionally, the method further comprises the step of drying the adhesive composition after applying.

An adhesive is formed by curing the adhesive composition. The adhesive has excellent physical properties, including adhesive strength to a variety of substrates. When utilized for coated fasteners, the adhesive is useful for securely locking the fastener in place, such that the fastener is resistant to vibration and shock related slippage during use. As such, the adhesive may also be referred to as "thread lock," "thread adhesive," "fastener adhesive," or "locking adhesive." The adhesive may also be useful for providing a seal against potential leakage of fluids and/or gasses.

DETAILED DESCRIPTION

Disclosed is an adhesive composition. In various embodiments, the adhesive composition can be in a wet form or in a dry form. The physical form of the adhesive composition may depend on, for example, time of manufacture, end application, etc. While wet, the adhesive composition may be referred to in the art as an aqueous-based adhesive composition, a water-based adhesive composition, or simply as an aqueous adhesive composition. As described below, the adhesive composition is generally liquid (or wet) during formation and solid (or dry) after formation and application. When used in conjunction with a fastener, the adhesive composition may be referred to in the art as a fastener adhesive.

The adhesive composition generally cures to form an adhesive. Drying is distinguished from curing. For example, drying merely drives a carrier/vehicle (e.g. water) from the adhesive composition without initiating curing or crosslinking of the components thereof.

A method of making the adhesive composition, an article, and an assembly including the article are also disclosed. Exemplary articles include, but are not limited to, fasteners, such as screws, bolts, nuts, pipe joints, threaded nails, and the like. The disclosure is not limited to a particular type of fastener. A method of making the article is also disclosed.

As used herein, the term "adhesive composition," is generally used prior to initiating cure of the adhesive composition, and can refer to the adhesive composition while in either a liquid, wet or dry form. The term "adhesive," is generally used any time after cure of the adhesive composition is initiated, and need not refer to the adhesive in a final cure state. Cure of the adhesive is generally initiated, for example, during or after a coated fastener is put in place (or installed) for its end application.

Adhesive Composition

The adhesive composition comprises an epoxy resin, a binder, and a curing agent. In various embodiments, the adhesive composition consists essentially of the epoxy resin, binder, and curing agent. While wet, the adhesive composition further comprises an aqueous solvent, and while dry, the adhesive composition is substantially to completely free of the aqueous solvent. Specifically, the adhesive composition generally comprises the aqueous solvent during formation; however, the aqueous solvent may be absent from the adhesive composition after formation and application (e.g. after drying).

It is to be appreciated that the parts by weight values described below generally relate to the adhesive composition while in a liquid/wet form. One of ordinary skill in the art can readily normalize such values to determine parts by weight when the adhesive composition is in a solid/dry form.

At least one of the epoxy resin or curing agent is encapsulated. For example, the epoxy resin can be encapsulated, the curing agent can be encapsulated, or both the epoxy resin and curing agent can individually be encapsulated. Typically, the epoxy resin is encapsulated as described below.

In various embodiments, the adhesive composition can further comprise one or more optional components. Examples of such components include conventional additives. In other embodiments, the adhesive composition further includes one or more components described in U.S. Patent App. Pub. No. 2004/0258922 A1 to Willett et al. (hereinafter "Willett"), which is incorporated herein by reference in its entirety.

Epoxy Resin

Various types of epoxy resins can be utilized in the adhesive composition. Typically, the epoxy resin is multifunctional, i.e., has two or more epoxide functional groups. In various embodiments, the epoxy resin has an average functionality of from about 2 to about 3, about 2.2 to about 2.8, about 2.4 to about 2.6, or about 2.5. In certain embodiments, the epoxy resin comprises at least one of a bisphenol A epoxy resin, a bisphenol F epoxy resin, a novolac epoxy resin, an aliphatic epoxy resin, or a glycidyamine epoxy resin. In many embodiments, the epoxy resin comprises at least one of a bisphenol F epoxy resin or a novolac epoxy resin. In specific embodiments, the epoxy resin comprises, or consists of, a bisphenol F epoxy resin. In other specific embodiments, the epoxy resin comprises, or consists of, a novolac epoxy resin.

The epoxy resin can be of various molecular weights. In various embodiments, the epoxy resin has a weight per epoxide of from about 150 to about 200, about 160 to about 195, or about 165 to about 195, g/eq. In certain embodiments, the epoxy resin has a weight per epoxide of from about 165 to about 185, or about 170 to about 180, alternatively of from about 175 to about 200, or about 180 to about 195, g/eq. Various ranges and subranges between the aforementioned lower and upper weights are contemplated.

Specific examples of suitable bisphenol F epoxy resins include those commercially available from Huntsman Advanced Materials of East Lansing, Mich., under the trademark ARALDITE®, such as ARALDITE® GY-282. Specific examples of suitable novolac epoxy resins include those commercially available from Momentive Specialty Chemicals of Waterford, N.Y., under the trademark EPON™, such as EPON™ 160 and EPON™ 815C. In other embodiments, the adhesive composition includes one or more epoxy resins described in Willett as "Epoxy Capsules." Mixtures of epoxy resins may be used in the adhesive composition.

The epoxy resin is typically encapsulated, more typically microencapsulated. Said another way, the epoxy resin is generally contained in capsules having an average diameter in the micron scale. Encapsulation of the epoxy resin is useful to maintain separation of the epoxy resin from the amine curative.

The epoxy resin can be encapsulated by various methods in the art and this disclosure is not limited to a particular one. In certain embodiments, the epoxy resin is encapsulated via in-situ polymerization and/or via deposition of a shell material to the surface of the epoxy resin within an aqueous emulsion. Reaction conditions for encapsulation are understood by those of ordinary skill in the art or can be determined via routine experimentation.

The shell material may be of various chemistries. In certain embodiments, the shell material comprises formaldehyde-urea, formaldehyde-melamine, formaldehyde-resorcinol, or combinations thereof. In many embodiments, the shell material comprises a melamine and/or resorcinol modified formaldehyde-urea resin. It is thought that melamine and resorcinol modifications generally increase cross-link density of the shell material and provide increased stability in aqueous applications.

The amount of epoxy resin within the microcapsules can vary. In certain embodiments, the epoxy resin is present in an amount of from about 10 to about 90, about 20 to about 85, about 30 to about 80, about 45 to about 75, or about 50 to about 70, parts by weight, each based on 100 parts by weight of the encapsulated epoxy resin. In these embodiments, the remaining parts by weight of the encapsulated epoxy resin, is predominantly or entirely shell material. Various ranges and subranges between the aforementioned lower and upper amounts are contemplated.

The encapsulated epoxy resin can be present in the adhesive composition in various amounts. In certain embodiments, the encapsulated epoxy resin is present in an amount of from about 5 to about 95, about 10 to about 90, about 10 to about 85, about 10 to about 80, about 10 to about 70, about 10 to about 60, about 15 to about 55, about 20 to about 50, about 25 to about 50, about 25 to about 45, about 30 to about 45, about 35 to about 45, or about 40, parts by weight, each based on 100 parts by weight of the adhesive composition. Various ranges and subranges between the aforementioned lower and upper amounts are contemplated.

Binder

Various types of binders can be utilized in the adhesive composition. The binder is typically at least water dispersible, more typically water soluble. As used herein, the term "water dispersible" generally refers to a material that is not water soluble but that can be emulsified or suspended in water. Moreover the term "water soluble" generally refers to a material that can be dissolved in water. The solubility is typically at least about 0.1 gram per mole of water.

In certain embodiments, the binder comprises a polymeric amine. In many embodiments, the binder is a polyethylenimine ("PEI"). Various types of PEIs can be used, including linear PEIs, branched PEIs, dendritic PEIs, or combinations thereof. A PEI may also be referred to as a polyaziridine or a poly(iminoethylene).

Depending on its chemistry, the binder does not necessarily play an active role in the cure process of the adhesive. However, using a polyamine allows for the binder to also provide a reactive component to the adhesive composition.

The binder can be of various molecular weights. In various embodiments, the binder (e.g. a PEI) has a molecular weight of from about 800 to about 1,000,000, about 5,000 to about 950,000, about 25,000 to about 900,000, about 50,000 to about 850,000, about 100,000 to about 800,000, about 250,000 to about 750,000, about 500,000 to about 750,000, or about 750,000. Various ranges and subranges between the aforementioned lower and upper weights are contemplated.

The binder can be used neat (i.e., alone) or in solution, typically in solution. The amount of binder within the binder solution can vary. In certain embodiments, the binder is present in an amount of from about 10 to about 90, about 25 to about 75, about 40 to about 60, or about 50, parts by weight, each based on 100 parts by weight of the binder solution. In these embodiments, the remaining parts by weight of the binder solution, is predominantly or entirely water. The solution may also be an emulsion. Various ranges and subranges between the aforementioned lower and upper amounts are contemplated.

Specific examples of suitable binders (or binder solutions) include those commercially available from BASF Corporation of Florham Park, N.J., under the trademark LUPASOL®, such as LUPASOL® FG, LUPASOL® P, LUPASOL® WF, LUPASOL® G20 Waterfree, and LUPASOL® PR 8515. Other specific examples of suitable binders include those commercially available from Air Products of Allentown, Pa., under the trademark ANQUAMINE®, including ANQUAMINE® 401 and ANQUAMINE® 701. In other embodiments, the adhesive composition includes one or more binders described in Willett as "Polymeric Amines" and/or "Optional Additional Organic Binder Material." Mixtures of binders may be used in the adhesive composition.

The binder can be present in the adhesive composition in various amounts. In certain embodiments, the binder is present in an amount of from about 0.5 to about 90, about 1 to about 30, about 1 to about 20, about 2 to about 15, about 5 to about 15, about 5 to about 10, about 6 to about 9, about 7 to about 9, or about 8, parts by weight, each based on 100 part(s) by weight of the adhesive composition. Various ranges and subranges between the aforementioned lower and upper amounts are contemplated. These amounts are generally based on the amount of binder while in solution (as described above). As such, the amounts can be adjusted based on solids content, if needed.

Curing Agent

Various types of curing agents can be utilized in the adhesive composition. The curing agent is typically at least water dispersible, more typically water soluble. The curing agent is different from the binder and typically comprises an amine. In certain embodiments, the curing agent comprises at least one of a tertiary aromatic amine, an aromatic amine, or a tertiary amine. Suitable compounds may have additional amine groups different from tertiary amine groups, such as primary amine groups and/or secondary amine groups. Moreover, suitable compounds can be aromatic, aliphatic, or a combination of both. In many embodiments, the curing agent is a tertiary aromatic amine. In specific embodiments, the tertiary aromatic amine is 2,4,6-tris(dimethylaminomethyl)phenol. In other specific embodiments, the curing agent is dimethylamino(methyl)phenol. In these embodiments, the curing agent can comprise ortho-isomers of dimethylamino(methyl)phenol, para-isomers of dimethylamino(methyl)phenol, or combinations thereof. In yet other specific embodiments, the curing agent is 1,3-Bis[3-(dimethylamino)propyl]urea.

It is to be appreciated that the curing agent is different from the binder, despite the possibility of both the binder and curing agent having amine functional groups. Specific examples of suitable curing agents include those commercially available from Prox-Chem America, Inc. of Londonderry, N.H., under the trademark ACTIRON®, such as ACTIRON® NX-3. Other specific examples of suitable curing agents include those commercially available from BASF Corporation under the trademark VERSAMINE®, such as VERSAMINE® EH 50. Yet other specific examples of suitable curing agents include those commercially available from Air Products under the trademark ANCAMINE®, including ANCAMINE® K54 and ANCAMINE® 1110. Mixtures of curing agents may be used in the adhesive composition.

The curing agent can be present in the adhesive composition in various amounts. In certain embodiments, the curing agent is present in an amount of no greater than about 60, no greater than about 50, no greater than about 40, no greater than about 30, no greater than about 25, no greater than about 20, or no greater than about 15, alternatively of from about 1 to about 30, about 1 to about 25, about 1 to about 20, about 5 to about 20, about 5 to about 15, about 5 to about 10, or about 10, part(s) by weight, each based on 100 parts by weight of the adhesive composition. Various ranges and subranges between the aforementioned lower and upper amounts are contemplated.

Optional Additive(s)

In certain embodiments, the adhesive composition further comprises at least one additive. For example, the adhesive composition may further comprise at least one additive for modifying at least one property (e.g. a physical property) thereof or of the adhesive formed by curing the adhesive composition. The property may be, for example, installation torque, flow properties, coefficient of friction, viscosity, hardness, etc.

If utilized, the additive can comprise any conventional additive in the art. In certain embodiments, the additive is selected from the group of pigments, surfactants, viscosity modifiers, waxes, fillers, impact modifiers, expansion agents, or combinations thereof. In other embodiments, the adhesive composition includes one or more additives described in Willett as "Optional Cross-Linking Agents," "Optional Fillers," "Optional Thickeners," and/or "Other Additives." Mixtures of additives may be used in the adhesive composition. Suitable additives are commercially available from a large number of suppliers.

If utilized, the pigment is typically at least water dispersible. Suitable pigments are commercially available from a variety of suppliers. One of ordinary skill in the art can readily select a suitable pigment (or pigments) based on want or need. Pigments are useful for imparting the adhesive composition with color.

The pigment can be of various colors. For example, the adhesive composition can be tinted blue by using phthalocyanine blue as the pigment. Specific examples of suitable pigments include those commercially available from BASF Corporation under the trademark MICROLITH®, such as MICROLITH® Blue 7080 WA. Mixtures of pigments may be used in the adhesive composition.

If utilized, the pigment can be present in the adhesive composition in various amounts. In certain embodiments, the pigment is present in an amount of from about 0.01 to about 20, about 0.5 to about 10, about 0.5 to about 5, about 0.5 to about 2.5, about 0.5 to about 2, about 0.5 to about 1, or about 0.5, part(s) by weight, each based on 100 parts by weight of the adhesive composition. Various ranges and subranges between the aforementioned lower and upper amounts are contemplated.

If utilized, suitable surfactants are commercially available from a variety of suppliers. One of ordinary skill in the art can readily select a suitable surfactant (or surfactants) based on want or need. Surfactants are useful for reducing surface tension or stabilizing pigment dispersion if also present in the adhesive composition. Surfactants may also be referred to in the art as dispersants or anti-settling aids. In certain embodiments, the anti-settling aid comprises a solution of modified urea.

Specific examples of surfactants suitable for the adhesive composition include ionic, nonionic, and Zwitterionic surfactants. Examples of suitable surfactants also include defoamers and rheology modifiers. Specific examples of suitable defoamers include those commercially available from BASF Corporation under the trademark SURFYNOL®, such as SURFYNOL® DF-58. Specific examples of suitable anti-settling aids include those commercially available from Altana AG of Wesel, Germany, under the trademark BYK®, such as BYK®-420. Mixtures of surfactants may be used in the adhesive composition.

If utilized, the surfactant can be present in the adhesive composition in various amounts. In certain embodiments, the surfactant is present in an amount of from about 0.01 to about 5, about 0.05 to about 2.5, about 0.1 to about 2, about 0.1 to about 1, about 0.1 to about 0.5, or about 0.25 to about 0.5, part(s) by weight, each based on 100 parts by weight of the adhesive composition. Various ranges and subranges between the aforementioned lower and upper amounts are contemplated.

If utilized, suitable viscosity modifiers are commercially available from a variety of suppliers. One of ordinary skill in the art can readily select a suitable viscosity modifier (or viscosity modifiers) based on want or need. Viscosity modifiers are useful for adjusting viscosity of the adhesive composition. Moreover, the viscosity modifier can prevent settling of the encapsulated epoxy resin.

In certain embodiments, the viscosity modifier comprises fumed silica, typically hydrophilic fumed silica. Specific examples of suitable viscosity modifiers include those commercially available from Evonik Industries of Essen, Germany, under the trademark AEROSIL®, such as AEROSIL® 200. Mixtures of viscosity modifiers may be used in the adhesive composition.

If utilized, the viscosity modifier can be present in the adhesive composition in various amounts. In certain embodiments, the viscosity modifier is present in an amount of from about 0.01 to about 10, about 0.05 to about 5, about 0.1 to about 2.5, about 0.25 to about 2, about 0.5 to about 1.5, or about 1 to about 1.5, part(s) by weight, each based on 100 parts by weight of the adhesive composition. Various ranges and subranges between the aforementioned lower and upper amounts are contemplated.

Examples of waxes suitable for the adhesive composition include hydrocarbons, which may be naturally or synthetic and optionally modified. Specific examples of such waxes include those comprising or derived from styrene-acrylonitrile copolymers ("SAN"), acrylonitrile-butadiene-styrene copolymers ("ABS"), styrene-butadiene copolymers ("SB"), polyethylene ("HTPE" (high-temperature polyethylene), "LTPE" (low-temperature polyethylene)), polypropylene, poly-1-butene, polytetrafluoroethylene, polyethylene terephthalate ("PET"), polyamides, polyethylene glycol ("PEG"), polypropylene glycol, polyether sulfones ("PESU" or "PES"), polyvinyl chloride, polyvinylidene chlorides, polystyrene, impact-modified polystyrene, polyvinylcarbazole, polyvinyl acetate, polyisobutylene, polybutadiene, polysulfone, etc., and combinations thereof.

Suitable fillers for the adhesive composition include extending fillers and/or reinforcing fillers. Fibrous materials or fibers are also within the scope of such fillers. Fillers may have a variety of particle sizes, e.g. from dust-like particles to coarse-grain particles to elongated fibers. The filler may be organic and/or inorganic. Specific examples of fillers suitable for the adhesive composition in particle form include clays, such as kaolin; chalk; wollastonite; talcum powder; calcium carbonate; silicates; silica; ferrites; titanium dioxide; zinc oxide; graphite; glass particles, e.g. glass beads; and nanoscale fillers, such as carbon nanotubes, carbon black, nanoscale and other phyllosilicates, nanoscale aluminum oxide ("$Al_2O_3$"), nanoscale titanium dioxide ("$TiO_2$"), graphene, and nanoscale silicon dioxide ("$SiO_2$"). Nanoscale fillers typically have at least one dimension of less than 100 nanometers (nm). Specific examples of fillers suitable for the adhesive composition in fibrous form include boron fibers; glass fibers; carbon fibers; silica fibers; ceramic fibers; basalt fibers; aramid fibers; polyester fibers; nylon fibers; polyethylene fibers; and natural fibers, such as wood fibers, flax fibers, hemp fibers, and sisal fibers.

Specific examples of expansion agents suitable for the adhesive composition include those that release gasses (or a liquid such as water) upon the application of heat. In other words, the adhesive composition can include an additive that itself acts as or provides a physical blowing agent. Specific examples thereof include azocarbonamides and its activated forms, N,N'-dinitrosopentamethyenetetramine, sulfonyl hydrazides, p-toluenesulfonyl semicarbazide, and 5-phenyltetrazole. Alternatively, the expansion agent may comprise an encapsulated hydrocarbon, e.g. encapsulated butane or propone. In these embodiments, the encapsulated hydrocarbon includes a shell wall which softens or melts at elevated temperatures, resulting in the release of the hydrocarbon in a gaseous form. Alternatively still, the expansion agent may comprise metal hydroxide or other hydrated material, such as magnesium hydroxide, aluminum trihydroxide, alumina trihydrate, sodium sulfate decahydrate, magnesium sulfate heptahydrate, magnesium chloride hexahydrate, etc. Physical blowing agents are useful for expanding the adhesive composition during cure such that the resulting adhesive better locks a coated fastener into place by expanding onto/into opposing surfaces, e.g. complimentary threaded surfaces.

Any of these additives may be present in the adhesive composition in various amounts. If present, the additives are typically utilized in a collective amount of from greater than 0 to about 75, alternatively from greater than 0 to about 50, parts by weight, based on 100 parts by weight of the adhesive composition. In various embodiments, at least one additive is present in an in an amount of at least about 0.001, alternatively from about 1 to about 75, about 1 to about 50, or about 5 to about 50, parts by weight, based on 100 parts by weight of the adhesive composition. Various ranges and subranges between the aforementioned lower and upper amounts are contemplated.

Aqueous Solvent

The adhesive composition generally further comprises an aqueous solvent. The aqueous solvent is useful for carrying the other components of the adhesive composition (i.e., the epoxy resin, binder, and curing agent, and optionally, one or more additives). Thus, the aqueous solvent may also be referred to in the art as a vehicle or carrier. The aqueous solvent generally at least partially solubilizes, alternatively fully solubilizes, the binder and/or curing agent. Typically, the aqueous solvent vehicle comprises water, which may originate from various sources and may optionally be purified. In specific embodiments, the aqueous solvent is deionized ("DI") water. Mixtures of aqueous solvents may be used in the adhesive composition.

The aqueous solvent can be present in the adhesive composition in various amounts. In certain embodiments, the aqueous solvent is present in an amount of from about 10 to about 90, about 15 to about 80, about 20 to about 70, about 25 to about 60, about 30 to about 50, about 40 to about 50, or about 45, parts by weight, each based on 100 parts by weight of the adhesive composition. Various ranges and subranges between the aforementioned lower and upper amounts are contemplated. These amounts are generally in addition to any amount of aqueous solvent that may be present in a solution with another component, e.g. the binder while in a binder solution (as described above). The amount of aqueous solvent is useful for adjusting the solids content and/or viscosity of the adhesive composition.

In embodiments where the adhesive composition utilizes water as the aqueous solvent, the adhesive composition is generally considered to be water-based. As used herein, "water-based" refers to a composition that is substantially free of organic solvents. For example, the adhesive composition contains no more than about 5, no more than about 3, no more than about 2, no more than about 1, or no more than about 0.5, part(s) by weight organic solvent, each based on 100 parts by weight of the adhesive composition. In many embodiments, there is no organic solvent present in the adhesive composition.

Method of Forming the Adhesive Composition

The adhesive composition can be prepared by combining and mixing the components of the adhesive composition using conventional methods understood in the art. The components can be added simultaneously or sequentially. Typically low shear mixing equipment is used to prevent premature rupture of the encapsulated epoxy resin. The components can be added in any order when making the adhesive composition.

In one exemplary method of making a one part system, the following components are mixed: the encapsulated epoxy resin, binder, curing agent, aqueous solvent, and any optional additive(s). The encapsulated epoxy resin is typically added last to prevent breakage, but this is not required. The adhesive composition can also be made in a two part system, where the epoxy resin and curing agent are kept in separate parts, with each of the remaining components in either or both parts. In other embodiments, the adhesive composition can be made via one or more methods of formation described in Willett under "Methods of Making Adhesive Compositions."

The adhesive composition may be used directly after formation or may be stored in suitable containers for future use. In compounding, or in customer use, additional water may be added to adjust the viscosity of the adhesive composition as desired.

Article, Method of Forming the Article, and Method of Using the Article

The article comprises a substrate having a surface. The adhesive composition is disposed on the surface. As described above, the article is typically a fastener. As such, the surface typically comprises a threaded surface. In other embodiments, the adhesive composition can be used to form one or more other articles described in Willett under "Articles of Manufacture."

Fastener

The fastener comprises a threaded surface. The fastener further comprises the adhesive composition at least partially disposed on the threaded surface. The fastener, while including the adhesive composition (or the resulting adhesive) disposed thereon, is generally referred to hereinafter as the "coated fastener." Moreover, the term "coated," is not to be construed as limiting the coated fastener in any way, such as by limiting the coated fastener to a particular configuration or method of manufacture. The fastener, while free of the adhesive composition (or the resulting adhesive), is generally referred to hereinafter as the "fastener."

By "at least partially disposed," it is generally meant that the adhesive composition is disposed on a portion, a majority, or an entirety, of the threaded surface of the coated fastener. Typically, the adhesive composition is disposed about the threaded surface of the fastener to coat the threaded surface thereof, although partial coating of the threaded surface may be carried out, e.g. circumferentially and/or lengthwise. The adhesive composition may also be present on non-threaded portions of the coated fastener, e.g. on an adjacent smooth surface (or surfaces).

The present invention is not limited to a particular type of fastener. Typically, the fastener is a conventional fastener understood in the art. Suitable fasteners include, but are not limited to, bolts, nuts, screws, studs, stand-offs, plugs/caps, and combinations thereof. With bolts, screws, studs, and stand-offs, the fastener will generally have an elongated body which includes the threaded surface, and optionally, an adjacent smooth surface (or surfaces). The fastener may be of various types, drive types, head styles, diameters, and lengths. Combinations of different coated (or uncoated) fasteners may be utilized for a given end application, e.g. bolts and nuts, bolts and studs, bolts and screws, etc., or the coated fastener may be utilized alone, e.g. a coated bolt, a coated nut, etc.

The threaded surface may be external (i.e., male) or internal (i.e., female), and can be of various types, configurations, or patterns. As such, the threaded surface is not limited to, for example, a particular major diameter, minor diameter, pitch diameter, helix angle, thread angle, thread count, thread pitch, or number of crests/roots.

Average thickness of the adhesive composition on the coated fastener may be uniform or may vary. Typically, the adhesive composition fills at least a portion, a majority, or an entirety of the threaded surface roots. The adhesive composition may also cover at least a portion, a majority, or an entirety of the threaded surface crests. The total amount of adhesive composition utilized to coat the fastener is not limited and can be readily determined via routine experimentation for a given end application or need.

The fastener may be formed from conventional materials including, but not limited to, carbon steel, alloy steel, stainless steel ("SS"), plain steel ("PS"), iron, brass, bronze, titanium, aluminum, magnesium alloy, and combinations thereof. Typically, the fastener is formed from a metal or metal alloy to provide strength and rigidity.

The fastener may include various types of conventional plating and/or coating materials, including, but not limited to, zinc plating (e.g. galvanization, zinc flakes, etc.), chromium (or chrome) plating, nickel plating, cadmium plating, aluminum plating, magnesium coating, phosphate (e.g. dry phosphate) coating, and combinations thereof. Alternatively, the fastener may be a "virgin" or "bright" fastener (i.e., it may lack plating/coating). However, the fastener typically includes a conventional plating and/or coating material to prevent corrosion and/or aid in installation. The adhesive composition is generally disposed on or adjacent such plating and/or coating, which is typically already present on the fastener. Suitable fasteners for making the coated fasteners of the present invention are commercially available from a large number of suppliers.

The adhesive composition on the coated fastener is generally considered to be "dry," i.e., it is dry to the touch such that physical transfer from the coated surface is little to none. That being said, the adhesive composition on the coated fastener generally still has a moisture (or water) content, which may fluctuate based on the components thereof and ambient conditions (e.g. temperature and relative humidity). In various embodiments, the adhesive composition has a moisture content of less than about 20, less than about 15, less than about 10, less than about 5, less than about 1, or approaching 0, parts by weight, based on 100 parts by weight of the adhesive composition. Too much moisture may allow the adhesive composition to slough off the coated fastener, whereas too little moisture, e.g. no moisture, may make the adhesive composition brittle and prone to flaking off the coated fastener.

Method of Manufacture

The coated fastener can be made utilizing conventional techniques understood in the coated fastener art. In an exemplary method of manufacture, the method comprises the steps of providing the fastener and providing the adhesive composition. The method further comprises the step of applying the adhesive composition to at least a portion of the threaded surface of the fastener to form a coated fastener. Optionally, the method further comprises the steps of providing and applying a second composition to at least a portion of the adhesive composition.

The adhesive composition is typically liquid so that it may be applied on the threaded surface of the fastener via various wet coating techniques, such as dip coating, spin coating, flow coating, flood coating, spray coating, roll coating, gravure coating, sputtering, slot coating, inkjet printing, and combinations thereof. Typically, dip coating, flow coating, or flood coating are utilized. The adhesive composition may include various amounts of diluent, e.g. water, depending on the desired viscosity associated with a particular application technique, for example.

The adhesive composition may be applied immediately prior to use of the coated fastener, e.g. by a customer. Alternatively, the adhesive composition may be applied to the threaded surface of the fastener and subsequently shipped or stored as a "pre-applied" adhesive composition. In the latter case, the adhesive composition is typically dried to remove the aqueous solvent prior to shipment, storage, or use. This leaves the remaining components of the adhesive composition in place on the threaded surface. One of ordinary skill in the art can readily determine proper drying methodologies and conditions.

If desired, an underlying coating may be applied to a portion, a majority, or an entirety of the threaded surface of the fastener prior to applying the adhesive composition such that the adhesive composition does not directly contact the threaded surface of the coated fastener. Typically, however, the adhesive composition is applied directly to the threaded surface of the fastener. Such underlying coatings are typically distinguishable from conventional plating/coating materials present on fasteners.

Alternatively or in addition, one or more compositions or layers may be applied on the adhesive composition. For example, the adhesive composition may be applied to the threaded surface of the fastener to form a base coat layer, and a second composition may be applied on the base coat layer to form a top coat layer. The second composition may be the same as or different from the adhesive composition. Typically, the second composition is different from the adhesive composition such that a layered structure results. The second composition is typically flowable and may be applied via wet coating techniques, as described above. When the base coat and top coat layers are utilized, the layers are typically applied "wet-on-wet." As used herein, the fastener including at least the adhesive composition and optionally the second composition is also referred to as a coated fastener.

The second composition, when different from the adhesive composition, may be selected based on desired properties of the coated fastener. For example, the second composition may be utilized to increase a shelf life of the coated fastener, increase durability of the underlying adhesive composition (e.g. by encapsulation by the second composition), modify a coefficient of friction, etc.

Use of the second composition may be useful for assisting the adhesive composition in wetting out the threaded surface of the fastener during application, e.g. by further wetting out the adhesive composition and thus the threaded surface. This is especially true with threaded surfaces having small thread pitches. Moreover, the second composition may prevent bridging of the adhesive composition during application and/or cure, where the adhesive composition may separate from (or be spaced from) roots of the threaded surface and merely sit across crests of the threaded surface, which can decrease adhesion.

In certain embodiments, the second composition comprises a polymer or resin in a carrier vehicle. The polymer or resin is typically organic. The polymer or resin may be curable, i.e., subject to further cross-linking or bonding, or may not further react. For example, the polymer or resin may merely be dispersed in a carrier vehicle such that removal of the carrier vehicle results in a dried polymer or resin (or highly viscous polymer or resin) without the formation of additional crosslink sites. Specific examples of suitable polymers and resins include phenolics, polyesters, polyvinylbutyral, phenoxys, solid epoxies, polyureas, cellulosic resins, polyurethanes, polyamides, polyethers, alkyds, silicones, acrylonitriles, etc. The carrier vehicle is typically an organic solvent and may be aliphatic and/or aromatic. Specific examples thereof include alcohols, acetone, methylethyl ketone ("MEK"), toluene, xylene, heptane, hexane, ethers, etc. The second composition may further comprise any of the additives described above with regard to the adhesive composition, as well as, for example, a plasticizer. Typically, the adhesive composition and the second composition may be dried (or cured) via similar mechanisms, e.g. heat, so a single drying step may be utilized.

If utilized, the second composition can be present in various amounts. Typically, the second composition is present in an amount less than that of the adhesive composition so as to not impede the adhesive composition, e.g. during cure. For example, the second composition may make up about 5 to less than 50, about 10 to about 40, about 15 to about 30, or about 20 to about 25, parts by weight, based on 100 parts by weight of the adhesive composition and second composition combined. Various ranges and subranges between the aforementioned lower and upper amounts are contemplated.

The adhesive composition, and if present, the second composition, may be dried by heating. The adhesive composition typically dries upon exposure to heat, e.g. in an oven or from another heat source. Alternatively, the adhesive composition may be dried at room temperature (e.g. air dried at 23±3° C.). Typically, drying is carried out at a temperature of no greater than about 100° C. to dry the adhesive composition on the coated fastener. This temperature range can facilitate drying while preventing premature cure or boiling of the adhesive composition (which can disrupt the coating layer and thus adhesion).

Method of Use

The coated fasteners including the adhesive composition may be utilized in diverse applications understood in the coated fastener art, e.g. to join various elements or substrates. In an exemplary method of use, the method comprises the steps of providing adjacent elements and providing the coated fastener. The method further comprises the step of disposing the coated fastener adjacent and/or through the adjacent elements. For example, a coated nut would generally be "adjacent," whereas a coated bolt or coated screw would generally be "through."

The adhesive is formed from the adhesive composition by curing the adhesive composition. The adhesive composition is typically curable upon exposure to shear such that the encapsulated epoxy resin ruptures, e.g. when the coated fastener is installed/used. The adhesive composition may be cured at room or ambient temperature (e.g. 23±3° C.), although adhesive properties may improve with the addition of heat. The adhesive has excellent physical properties and may be utilized in diverse applications. Specifically, the adhesive has excellent temperature resistance, durability, and adhesiveness to a variety of substrates.

The present invention also provides a substrate including a coated fastener at least partially disposed therein. The coated fastener includes the adhesive composition (and optionally the second composition and any other layers desired) in a partially cured or uncured state. Alternatively, the adhesive composition may be cured such that the coated fastener is bonded to the substrate via the adhesive formed by curing the adhesive composition.

Assembly

The assembly includes the coated fastener. The adhesive composition can be in a pre-cure, curing, or post-cure (i.e., adhesive) state depending on status of the coated fastener with respect to the assembly. For example, if the coated fastener is only partially disposed (e.g. not tightened down), the encapsulated epoxy resin may not have been exposed to sufficient shear to cause rupture. Alternatively, if the coated fastener is fully disposed (e.g. tightened down), the encapsulated epoxy resin has been ruptured to initiate reaction to form the adhesive.

As known in the art, coated fasteners may be utilized to join adjacent elements or substrates. To this end, the substrate may comprise two different elements, substrates, or layers, with the coated fastener disposed adjacent and/or through the substrate. Typically, the substrate defines an aperture, and the coated fastener is disposed in the aperture defined by the substrate. Alternatively, the coated fastener may form the aperture in situ while being disposed in the substrate (e.g. in the case of self-tapping screws). The adhesive composition is particularly suited for use on bolt-and-nut assemblies or other threaded fasteners. In other embodiments, the adhesive composition can be used in one or more other end applications as described in Willett under "Specific Uses."

Additional types of suitable fasteners, additives, secondary components (e.g. platings/coatings), methods of manufacture (e.g. coating techniques), and/or uses (e.g. element fastening), are described in U.S. Pat. Nos. 5,426,130; 5,651,824; 5,656,325; 5,672,376; 5,679,160; 5,928,711; 5,964,551; 6,027,568; 6,270,838; 6,322,628; 6,474,919; 6,817,816; 7,404,483; 7,521,402; 7,771,148; 7,772,316; 7,878,744; 8,865,794; and 8,865,812; US Publication Nos. 2008/0292426; 2014/0199135; 2015/0014126; 2015/0056394 and 2015/0232692; International Application No. PCT/US2015/045979; and International Publication Nos. WO1999066219; WO2008073262; WO2008094535; WO2008094537; WO2008153866; and WO2008153868; the disclosures of which are hereby incorporated by reference in their entirety.

INDUSTRIAL APPLICABILITY

While the present invention is not limited to a particular end application, use or industry, industrial and automotive equipment manufacturers often rely on coated fasteners to prevent critical parts from failing. The adhesive has excellent physical properties, including adhesive strength to a variety of substrates. The adhesive is useful for securely locking the coated fastener in place, such that the coated fastener is resistant to vibration and shock related slippage during use. As such, the adhesive may also be referred to as "thread lock," "thread adhesive," "fastener adhesive," or "locking adhesive." The adhesive may also be useful for providing a seal against potential leakage of fluids and/or gasses.

Articles, e.g. fasteners, that are coated with the adhesive composition can typically be stored for extended periods (e.g. months) prior to assembly. The coated articles can be stored in climates with elevated temperature and humidity without adversely affecting the performance characteristics of the resulting adhesive. The adhesive composition is not limited to use only with fasteners. For example, the adhesive composition may be utilized as a sealant, to form an adhesive that adjoins adjacent layers or substrates in a composite article, etc. The adhesive compositions of this disclosure form adhesives that have physical properties that align with or exceed those expected from a conventional adhesive formed from an organic solvent based adhesive composition.

The following examples are intended to illustrate the present invention and are not to be viewed in any way as limiting to the scope of the present invention.

EXAMPLES

Examples of adhesive compositions are prepared in a laboratory to determine performance. To make the adhesive compositions, the binder and curing agent are combined with the aqueous solvent to make a solution. Next, the additives and solution are combined to form a mixture. The mixture is stirred. Once the mixture is uniform, the epoxy resin is slowly and gently added to the mixture to form the adhesive composition.

Table I below summarizes the components used in Examples 1, 2, and 3, generally with Examples 1 and 3 being invention/working examples and Example 2 being a comparative example. Additional details and test data follows below.

TABLE I

| Component | Example | | |
|---|---|---|---|
| (parts by weight) | 1 | 2 | 3 |
| Binder 1 | 7.00 | 0 | 7.55 |
| Binder 2 | 0 | 8.14 | 0 |
| Curing Agent 1 | 9.32 | 9.32 | 11.00 |
| Aqueous Solvent | 43.25 | 41.58 | 38.5 |
| Additive 1 | 0.50 | 1.02 | 0.5 |

TABLE I-continued

| Component | Example | | |
|---|---|---|---|
| (parts by weight) | 1 | 2 | 3 |
| Additive 2 | 1.25 | 1.50 | 2.00 |
| Additive 3 | 0.52 | 0.28 | 0.64 |
| Epoxy Resin 1 | 38.16 | 38.16 | 39.81 |
| Total | 100.00 | 100.00 | 100.00 |

Binder 1 is a PEI, and more specifically a high molecular weight ethylenimine homopolymer. Binder 1 had a solids content of from 48 to 52 wt. %, a molecular weight of 750,000, a pH of 11, and a viscosity of from 18,000 to 40,000 mPAS·s at 20° C. Binder 1 is commercially available from BASF Corporation.

Binder 2 is an aqueous emulsion of an acrylic resin. Binder 2 has a solids content of 43 wt. % and viscosity of from 200 to 1,800 cP at 25° C. Binder 2 is commercially available from The Dow Chemical Company of Midland, Mich.

Curing Agent 1 is 2,4,6-Tris(dimethylaminomethyl)phenol.

Aqueous Solvent is DI water.

Additive 1 is pigment, specifically phthalocyanine blue. Additive 1 is commercially available from BASF Corporation.

Additive 2 is a viscosity modifier, and more specifically hydrophilic fumed silica with a BET of 200±25 $m^2/g$. Additive 2 is commercially available from Evonik Industries.

Additive 3 is an anti-settling aid for Additive 1, specifically a solution of a modified urea commercially available from Altana.

Epoxy Resin 1 is microencapsulated epoxy resin. The microencapsulated epoxy resin contains approximately 50 to 70 wt. % epoxy resin. The epoxy resin is a multifunctional novolac resin with an average functionality of from 2.5 to 2.6. The epoxy resin may be referred to as an epoxy bisphenol F ("BPF") novolac resin, has a viscosity of from 345 to 485 poise ("P") at 25° C. (per ASTM D445), and a weight per epoxide of from 168 to 178 g/eq (per ASTM D1652). The epoxy resin is commercially available from Momentive Specialty Chemicals. The shell material is melamine modified urea-formaldehyde deposited via an in-situ process of microencapsulation.

The adhesive composition of Example 1 is characterized by measuring viscosity, installation torque, breakaway torque, and prevailing-off torque. Initial Brookfield viscosity using spindle #2 at 20 rpm (later referred to as "BV (#2 @ 20)") is 572 cps. The viscosity is measured over a period of 8 weeks and is found to increase only 28 cps to 600 cps. Initial installation torque, breakaway torque, and prevailing-off torque are measured on ⅜" dry phosphate (coated) bolts with dry phosphate (coated) nuts. Torque measurements were generally measured as per ASTM D5649.

The ⅜" dry phosphate fasteners are coated with the adhesive composition of Example 1 and dried in an oven for 10 minutes at 70° C. The coated parts are allowed to acclimate to ambient conditions (23±3° C.) overnight prior to installation. Installation is performed by hand, alluding to a torque value of less than 5 inch*pounds (or pound-force inch). Breakaway torque and prevailing-off torque are found to be 325 inch*pounds and 190 inch*pounds, respectively, after a 24 hour ambient cure and based on an average of 5 parts. Initial installation torque, breakaway torque, and prevailing-off torque are also measured on ⅜" zinc plated bolts with zinc plated nuts. Installation is performed by hand. Breakaway torque and prevailing-off torque are found to be 122 inch*pounds (~13.8 Newton meters; "N·m") and 166 inch*pounds (~18.8 N·m), respectively, after a 24 hour ambient cure and based on an average of 5 parts.

The adhesive composition of Example 2 is prepared to compare shelf-life and stability performance with the adhesive composition of Example 1. The adhesive composition of Example 2 is characterized by measuring viscosity, installation torque, breakaway torque, and prevailing-off torque. Initial Brookfield viscosity using spindle #2 at 20 rpm is 676 cps. Initial installation torque, breakaway torque, and prevailing-off torque are measured on ⅜" dry phosphate bolts with dry phosphate nuts.

The ⅜" dry phosphate fasteners are coated with adhesive composition of Example 2 and dried in an oven for 10 minutes at 70° C. The coated parts are allowed to acclimate to ambient conditions overnight prior to installation. Installation torque is found to be 5.4 inch*pounds, breakaway torque and prevailing-off torque are found to be 276 inch*pounds and 186 inch*pounds, respectively, after a 24 hour ambient cure and based on an average of 5 parts.

In order to compare the shelf-life and stability of each sample, ⅜" dry phosphate bolts are coated on a weekly basis from these two adhesive compositions. Installation ("Inst.") torque, breakaway ("Break.") torque, and prevailing-off ("Prev.") torque are measured. Results can be found in Table II below. Torque values are generally provided in pound-force inch ("lbf·in") and converted to Newton meters ("N·m") unless indicated otherwise. Acceptable installation torque values are less than 25 inch*pounds (or less than ~2.8 N·m). Once installation torque exceeded acceptable values, testing is discontinued (indicated by "ND"). This comparison clearly demonstrates the superior shelf-life and stability of Example 1 relative to Example 2.

TABLE II

A

Torque Performance - Example 1

| Time | Install. (lbf · in) | Install. (N · m) | Break. (lbf · in) | Break. (N · m) | Prevail. (lbf · in) | Prevail. (N · m) |
|---|---|---|---|---|---|---|
| Initial | <5 | <0.56 | 325 | 36.7 | 190 | 21.5 |
| Week 1 | <5 | <0.56 | 363 | 41.0 | 238 | 26.9 |
| Week 2 | <5 | <0.56 | 365 | 41.2 | 300 | 33.9 |
| Week 4 | 5.9 | 0.67 | 340 | 38.4 | 260 | 29.4 |
| Week 6 | 8.0 | 0.90 | 355 | 40.1 | 215 | 24.3 |
| Week 8 | 29.2 | 3.30 | 305 | 34.5 | 285 | 32.2 |

B

Torque Performance - Example 2

| Time | Install. (lbf · in) | Install. (N · m) | Break. (lbf · in) | Break. (N · m) | Prevail. (lbf · in) | Prevail. (N · m) |
|---|---|---|---|---|---|---|
| Initial | 5.4 | 0.61 | 276 | 31.2 | 186 | 21.0 |
| Week 1 | 9.75 | 1.10 | 256 | 28.9 | 250 | 28.2 |
| Week 2 | 36 | 4.07 | 240 | 27.1 | 265 | 29.9 |
| Week 4 | ND | ND | ND | ND | ND | ND |
| Week 6 | ND | ND | ND | ND | ND | ND |
| Week 8 | ND | ND | ND | ND | ND | ND |

The adhesive composition of Example 3 is characterized by measuring viscosity, installation torque, breakaway torque, and prevailing-off torque. Initial Brookfield viscosity using spindle #2 at 20 rpm is 1,100 cps and initial Zahn Cup #3 is 60.2 seconds. Initial installation torque, breakaway torque, and prevailing-off torque are measured on ⅜" dry phosphate bolts with dry phosphate nuts.

The ⅜" dry phosphate fasteners are coated with the adhesive composition of Example 3 and dried in an oven for 10 minutes at 70° C. The coated parts are allowed to acclimate to ambient conditions overnight prior to installation. Installation is 4.5 inch*pounds (~0.51 N·m), breakaway torque and prevailing-off torque are found to be 353 inch*pounds (~39.9 N·m) and 307 inch*pounds (~34.7 N·m), respectively, after a 24 hour ambient cure and based on an average of 5 parts. Initial installation torque, breakaway torque, and prevailing-off torque are also measured on ⅜" zinc plated bolts with zinc plated nuts. Installation torque is 3.3 inch*pounds (~0.37 N·m), breakaway torque and prevailing-off torque are found to be 238 inch*pounds (~26.9 N·m) and 208 inch*pounds (~23.5 N·m), respectively, after a 24 hour ambient cure and based on an average of 5 parts.

In order to test the on-fastener shelf-life of the applied fastener adhesive, M10 dry phosphate fasteners are coated in a production processing environment after reducing the Zahn Cup #3 viscosity of the adhesive composition of Example 3 from 60.2 seconds to 18 seconds by mixing in DI water.

Installation torque, breakaway torque, and prevailing-off torque are measured upon mating the coated M10 dry phosphate bolt with an M10 zinc plated nut. The initial installation torque is performed by hand, alluding to an installation torque value of less than 5 inch*pounds. The initial breakaway torque and initial prevailing-off torque are found to be 220 inch*pounds (~24.9 N·m) and 270 inch*pounds (~30.5 N·m), respectively, after a 24 hour ambient cure and based on an average of 5 parts.

The remaining parts are stored in a laboratory cabinet under ambient conditions throughout the duration of testing. After 52 weeks under these conditions, the installation torque is only 6.4 inch*pounds (~0.72 N·m), the breakaway torque is 267 inch*pounds (~30.2 N·m), and the prevailing-off torque is 275 inch*pounds (~31.1 N·m), after a 24 hour ambient cure and based on an average of 5 parts. This data indicates very good on-fastener stability. Additional examples are described below.

Working Example 4

Another sample of adhesive composition, similar to that of Example 1, was prepared by mixing 7.00 parts Binder 1 and 9.32 parts Curing Agent 2, with 43.25 parts Aqueous Solvent. Into this solution, 0.50 parts Additive 1, 1.25 parts Additive 2, and 0.52 parts Additive 3 are dispersed. Once the mixture has become uniform, 38.16 parts Epoxy Resin 1 are slowly and gently dispersed within the aqueous solution.

Curing Agent 2 is 1,3-Bis[3-(dimethylamino)propyl]urea.

This adhesive composition was characterized by measuring viscosity, installation torque, breakaway torque, and prevailing-off torque. Initial Brookfield viscosity using spindle #2 at 20 rpm was 334 cps and initial Zahn Cup #3 was 22.16 seconds. Initial installation torque, breakaway torque, and prevailing-off torque were measured on ⅜" zinc plated bolts with zinc plated nuts. Installation torque, breakaway torque and prevailing-off torque were found to be 3.10 inch*pounds (~0.350 N·m), 250 inch*pounds (~28.2 N·m) and 155 inch*pounds (~17.5 N·m), respectively, after a 24 hour ambient cure and based on an average of 5 parts.

Working Example 5

Another sample of adhesive composition, similar to that of Example 1, was prepared by mixing 7.00 parts Binder 1 and 9.32 parts Curing Agent 3, with 43.25 parts Aqueous Solvent. Into this solution, 0.50 parts Additive 1, 1.25 parts Additive 2, and 0.52 parts Additive 3 are dispersed. Once the mixture has become uniform, 38.16 parts Epoxy Resin 1 are slowly and gently dispersed within the aqueous solution.

Curing Agent 3 is dimethylamino(methyl)phenol.

This adhesive composition was characterized by measuring viscosity, installation torque, breakaway torque, and prevailing-off torque. Initial Brookfield viscosity using spindle #2 at 20 rpm was 332 cps and initial Zahn Cup #3 was 20.62 seconds. Initial installation torque, breakaway torque, and prevailing-off torque were measured on ⅜" zinc plated bolts with zinc plated nuts. Installation torque, breakaway torque and prevailing-off torque were found to be 4.40 inch*pounds (~0.50 N·m), 121 inch*pounds (~13.7 N·m) and 113 inch*pounds (~12.8 N·m), respectively, after a 24 hour ambient cure and based on an average of 5 parts.

Working Example 6

Another sample of adhesive composition, similar to that of Example 1, was prepared by mixing 7.00 parts Binder 1 and 9.32 parts Curing Agent 1, with 43.25 parts Aqueous Solvent. Into this solution, 0.50 parts Additive 1, 1.25 parts Additive 2, and 0.52 parts Additive 3 are dispersed. Once the mixture has become uniform, 38.16 parts Epoxy Resin 1 are slowly and gently dispersed within the aqueous solution. Aqueous Solvent was then added to reduce the viscosity to 20 to 24 seconds by Zahn Cup #3.

This adhesive composition was characterized by measuring viscosity, installation torque, breakaway torque, and prevailing-off torque. Results for this adhesive composition can be found in Tables IV and V further below for comparison to results of working Example 7 and comparative Examples 8-1, 8-2, 8-3, and 8-4.

Working Example 7

Another sample of adhesive composition, similar to that of Example 1, was prepared by mixing 7.00 parts Binder 1 and 9.32 parts Curing Agent 1, with 43.25 parts Aqueous Solvent. Into this solution, 0.50 parts Additive 1, 1.25 parts Additive 2, and 0.52 parts Additive 3 are dispersed. Once the mixture has become uniform, 38.16 parts Epoxy Resin 2 are slowly and gently dispersed within the aqueous solution. Aqueous Solvent was then added to reduce the viscosity to 20 to 24 seconds by Zahn Cup #3.

Epoxy Resin 2 is microencapsulated epoxy resin. The microencapsulated epoxy resin contains approximately 50 to 70 wt. % epoxy resin. The epoxy resin is a bisphenol A ("BPA") based epoxy resin diluted with n-butyl glycidyl ether. The epoxy resin has a viscosity of from 5 to 7 P at 25° C., and a weight per epoxide of from 180 to 195 g/eq. The epoxy resin is commercially available from Momentive Specialty Chemicals. The shell material is melamine modified urea-formaldehyde deposited via an in-situ process of microencapsulation.

This adhesive composition was characterized by measuring viscosity, installation torque, breakaway torque, and prevailing-off torque. Results for this adhesive composition can be found in Tables IV and V further below for comparison to results of working Example 6 and comparative Examples 8-1, 8-2, 8-3, and 8-4.

Comparative Example 8

Examples 8-1 and 8-2 in Table III below are recreated as closely as possible to match "Example 2-1" and "Example 2-2" as described in U.S. Patent App. Pub. No. 2004/0258922 A1 to Willett et al. (i.e., Willett), respectively. Examples 8-3 and 8-4 substitute Epoxy Resin 1, such as those used in working Examples 1 through 6 above, for Epoxy Resin 2. The four formulations (Examples 8-1, 8-2, 8-3, and 8-4) were diluted with water such that the viscosity was between 20 and 24 seconds by Zahn Cup #3.

TABLE III

| Component | Example No. | | | |
|---|---|---|---|---|
| | 8-1 | 8-2 | 8-3 | 8-4 |
| Binder 3 | 60 | 0 | 60 | 0 |
| Binder 4 | 0 | 60 | 0 | 60 |
| Epoxy Resin 1 | 60 | 60 | 0 | 0 |
| Epoxy Resin 2 | 0 | 0 | 60 | 60 |
| Aqueous Solvent | 80 | 80 | 80 | 80 |

Binder 3 is ANQUAMINE® 401, which is commercially available from Air Products. This binder is a polyamine polymer, specifically a modified aliphatic amine supplied at 70% solids in water.

Binder 4 is ANQUAMINE® 701, which is commercially available from Air Products. This binder is a polyamine epoxy resin adduct supplied at 53-57% solids in water emulsion and has an amine value of 130-165 mg/KOH/g.

The compositions above were characterized by measuring viscosity, installation torque, breakaway torque, and prevailing off torque. Results for these compositions can be found in Tables IV and V below for comparison to results of working Examples 6 and 7.

TABLE IV

| | Viscosity - Initial | | Viscosity - 5 Week Aging | |
|---|---|---|---|---|
| Example No. | BV (#2 @ 20) (cps) | Zahn Cup #3 (sec) | BV (#2 @ 20) (cps) | Zahn Cup #3 (sec) |
| 6 | 408 | 23.66 | 444 | — |
| 7 | 396 | 23.47 | 1850 | — |
| 8-1 | 234 | 19.97 | *** | — |
| 8-2 | 258 | 20.5 | 1014 | — |
| 8-3 | 236 | 20.47 | 762 | — |
| 8-4 | 244 | 18.5 | 630 | — |

*** For comparative Example 8-1, viscosity exceeded the stated Brookfield spindle/speed combination. Brookfield viscosity #2 spindle at 5 rpm was 5545 cps and Brookfield viscosity #3 spindle at 20 rpm was 4860 cps.

TABLE V-A

| | Torque Performance - Initial | | | | | |
|---|---|---|---|---|---|---|
| Example No. | Install. (lbf·in) | Install. (N·m) | Break. (lbf·in) | Break. (N·m) | Prevail. (lbf·in) | Prevail. (N·m) |
| 6 | 2.3 | 0.26 | 209 | 23.6 | 159 | 18.0 |
| 7 | 3.3 | 0.37 | 173 | 19.5 | 134 | 15.1 |
| 8-1 | 4.9 | 0.55 | 120 | 13.6 | 164 | 18.5 |
| 8-2 | 7.5 | 0.85 | 46 | 5.2 | 26 | 2.9 |
| 8-3 | 5.3 | 0.60 | 61 | 6.9 | 81 | 9.2 |
| 8-4 | 10.4 | 1.18 | 41 | 4.6 | 39 | 4.4 |

Torque values were measured after 24 hour cure at ambient temperature (23±3° C.) on ⅜" zinc plated bolts and ⅜" zinc plated nuts.

In Table V-B below, the adhesive compositions (or slurries) were stored for 5 weeks prior to fastener application. After 5 weeks, the aged adhesive compositions were applied to the fasteners and dried to obtain coated fasteners. The coated fasteners were then tested for torque performance.

In Table V-C below, the adhesive compositions were applied to the fasteners and dried to obtain coated fasteners. The aged coated fasteners were then stored for 5 weeks prior to testing torque performance.

TABLE V-B

| | Torque Performance - 5 Week Aging: Slurry | | | | | |
|---|---|---|---|---|---|---|
| Example No. | Install. (lbf·in) | Install. (N·m) | Break. (lbf·in) | Break. (N·m) | Prevail. (lbf·in) | Prevail. (N·m) |
| 6 | 4.8 | 0.54 | 216 | 24.4 | 174 | 19.7 |
| 7 | 8.2 | 0.93 | 96 | 11 | 86 | 9.7 |
| 8-1 | 6.0 | 0.68 | 74 | 8.4 | 100 | 11.3 |
| 8-2 | 13.0 | 1.47 | 120 | 13.6 | 124 | 14.0 |
| 8-3 | 5.2 | 0.59 | 64 | 7.2 | 69 | 7.8 |
| 8-4 | 12.6 | 1.42 | 70 | 7.9 | 69 | 7.8 |

TABLE V-C

| | Torque Performance - 5 Week Aging: On-Part | | | | | |
|---|---|---|---|---|---|---|
| Example No. | Install. (lbf·in) | Install. (N·m) | Break. (lbf·in) | Break. (N·m) | Prevail. (lbf·in) | Prevail. (N·m) |
| 6 | 2.8 | 0.32 | 262 | 29.6 | 192 | 21.7 |
| 7 | 5.4 | 0.61 | 210 | 23.7 | 168 | 19.0 |
| 8-1 | 9.0 | 1.0 | 136 | 15.4 | 148 | 16.7 |
| 8-2 | 16.4 | 1.86 | 118 | 13.3 | 126 | 14.2 |
| 8-3 | 9.4 | 1.1 | 116 | 13.1 | 120 | 13.6 |
| 8-4 | 11.2 | 1.27 | 69 | 7.8 | 60 | 6.8 |

Both adhesive compositions from working Examples 6 and 7, which contain the additional Curing Agent, performed better than any of the compositions from comparative Example 8. Installation torque values for working Examples 6 and 7 were marginally lower than any of those from comparative Example 8, while breakaway torque values were significantly higher than any of those from comparative Example 8. In addition, the adhesive composition of working Example 6 demonstrated the most consistency over the 5 week aging period with regards to both viscosity and torque performance. This demonstrates a surprising and unexpected benefit of incorporating Curing Agent 1 into the formulation.

Additional Examples

Additional adhesive compositions are illustrated in Table VI below. Specifically, Table VI-A illustrates swapping out of the different Binders and/or Epoxy Resins with Curing Agent 1. Table VI-B illustrates swapping out of the different Binders and/or Epoxy Resins with Curing Agent 2. Table VI-C illustrates swapping out of the different Binders and/or Epoxy Resins with Curing Agent 3.

In these tables, the Aqueous Solvent can be used in a quantity sufficient ("q.s.") to reach 100 parts by weight total, although such an amount is typically from about 25 to about 50, or about 30 to about 45, parts by weight, based on 100 parts by weight of the adhesive composition. Various ranges and subranges between the illustrated lower and upper amounts of the adhesive composition components are contemplated.

TABLE VI-A

| Component (parts by weight) | Example | | | | | |
|---|---|---|---|---|---|---|
| | 9 | 10 | 11 | 12 | 13 | 14 |
| Binder 1 | 5-10 | 0 | 0 | 5-10 | 0 | 0 |
| Binder 2 | 0 | 0 | 0 | 0 | 0 | 0 |
| Binder 3 | 0 | 5-10 | 0 | 0 | 5-10 | 0 |
| Binder 4 | 0 | 0 | 5-10 | 0 | 0 | 5-10 |
| Curing Agent 1 | 8-12 | 8-12 | 8-12 | 8-12 | 8-12 | 8-12 |
| Curing Agent 2 | 0 | 0 | 0 | 0 | 0 | 0 |
| Curing Agent 3 | 0 | 0 | 0 | 0 | 0 | 0 |
| Aqueous Solvent | q.s. | q.s. | q.s. | q.s. | q.s. | q.s. |
| Additive 1 | 0-1.5 | 0-1.5 | 0-1.5 | 0-1.5 | 0-1.5 | 0-1.5 |
| Additive 2 | 1-3 | 1-3 | 1-3 | 1-3 | 1-3 | 1-3 |
| Additive 3 | 0-1.5 | 0-1.5 | 0-1.5 | 0-1.5 | 0-1.5 | 0-1.5 |
| Epoxy Resin 1 | 35-45 | 35-45 | 35-45 | 0 | 0 | 0 |
| Epoxy Resin 2 | 0 | 0 | 0 | 35-45 | 35-45 | 35-45 |
| Total | 100.00 | 100.00 | 100.00 | 100.00 | 100.00 | 100.00 |

TABLE VI-B

| Component (parts by weight) | Example | | | | | |
|---|---|---|---|---|---|---|
| | 15 | 16 | 17 | 18 | 19 | 20 |
| Binder 1 | 5-10 | 0 | 0 | 5-10 | 0 | 0 |
| Binder 2 | 0 | 0 | 0 | 0 | 0 | 0 |
| Binder 3 | 0 | 5-10 | 0 | 0 | 5-10 | 0 |
| Binder 4 | 0 | 0 | 5-10 | 0 | 0 | 5-10 |
| Curing Agent 1 | 0 | 0 | 0 | 0 | 0 | 0 |
| Curing Agent 2 | 8-12 | 8-12 | 8-12 | 8-12 | 8-12 | 8-12 |
| Curing Agent 3 | 0 | 0 | 0 | 0 | 0 | 0 |
| Aqueous Solvent | q.s. | q.s. | q.s. | q.s. | q.s. | q.s. |
| Additive 1 | 0-1.5 | 0-1.5 | 0-1.5 | 0-1.5 | 0-1.5 | 0-1.5 |
| Additive 2 | 1-3 | 1-3 | 1-3 | 1-3 | 1-3 | 1-3 |
| Additive 3 | 0-1.5 | 0-1.5 | 0-1.5 | 0-1.5 | 0-1.5 | 0-1.5 |
| Epoxy Resin 1 | 35-45 | 35-45 | 35-45 | 0 | 0 | 0 |
| Epoxy Resin 2 | 0 | 0 | 0 | 35-45 | 35-45 | 35-45 |
| Total | 100.00 | 100.00 | 100.00 | 100.00 | 100.00 | 100.00 |

TABLE VI-C

| Component (parts by weight) | Example | | | | | |
|---|---|---|---|---|---|---|
| | 21 | 22 | 23 | 24 | 25 | 26 |
| Binder 1 | 5-10 | 0 | 0 | 5-10 | 0 | 0 |
| Binder 2 | 0 | 0 | 0 | 0 | 0 | 0 |
| Binder 3 | 0 | 5-10 | 0 | 0 | 5-10 | 0 |
| Binder 4 | 0 | 0 | 5-10 | 0 | 0 | 5-10 |
| Curing Agent 1 | 0 | 0 | 0 | 0 | 0 | 0 |
| Curing Agent 2 | 0 | 0 | 0 | 0 | 0 | 0 |
| Curing Agent 3 | 8-12 | 8-12 | 8-12 | 8-12 | 8-12 | 8-12 |
| Aqueous Solvent | q.s. | q.s. | q.s. | q.s. | q.s. | q.s. |
| Additive 1 | 0-1.5 | 0-1.5 | 0-1.5 | 0-1.5 | 0-1.5 | 0-1.5 |
| Additive 2 | 1-3 | 1-3 | 1-3 | 1-3 | 1-3 | 1-3 |
| Additive 3 | 0-1.5 | 0-1.5 | 0-1.5 | 0-1.5 | 0-1.5 | 0-1.5 |
| Epoxy Resin 1 | 35-45 | 35-45 | 35-45 | 0 | 0 | 0 |
| Epoxy Resin 2 | 0 | 0 | 0 | 35-45 | 35-45 | 35-45 |
| Total | 100.00 | 100.00 | 100.00 | 100.00 | 100.00 | 100.00 |

The following additional embodiments are provided, the numbering of which is not to be construed as designating levels of importance:

Embodiment 1 relates to a fastener comprising: a threaded surface; and the adhesive composition at least partially disposed on the threaded surface. The adhesive composition comprises: the epoxy resin; the binder; the curing agent; and optionally, the aqueous solvent. At least one of the epoxy resin or curing agent is encapsulated.

Embodiment 2 relates to Embodiment 1, wherein the fastener is selected from the group consisting of bolts, nuts, screws, studs, stand-offs, plugs/caps and combinations thereof.

Embodiment 3 relates to use of a fastener to join adjacent elements, wherein the fastener is as set forth in Embodiment 1 or 2.

Embodiment 4 relates to a method of making a fastener comprising a threaded surface and an adhesive composition at least partially disposed on the threaded surface, the method comprising the steps of: providing a fastener; providing the adhesive composition; and applying the adhesive composition to at least a portion of the threaded surface of the fastener.

Embodiment 5 relates to the method as set forth in Embodiment 4, wherein the adhesive composition is a liquid and wherein the step of applying is further defined as coating at least a portion of the threaded surface with the adhesive composition.

Embodiment 6 relates to the method as set forth in Embodiment 5, further comprising the step of drying the adhesive composition after coating.

Embodiment 7 relates to the method as set forth in Embodiment 6, wherein the step of drying is further defined as heating the adhesive composition to a temperature of no greater than about 100° C. to dry the applied adhesive composition.

Embodiment 8 relates to the method as set forth in any one of Embodiments 4 to 7, further comprising the step(s) of applying a second composition different from the adhesive composition to at least a portion of the applied adhesive composition, and optionally, drying the second composition after applying.

Embodiment 9 relates to the method as set forth in any one of Embodiments 4 to 8, wherein the fastener is selected from the group consisting of bolts, nuts, screws, studs, stand-offs, plugs/caps, and combinations thereof.

Embodiment 10 relates to a method of joining adjacent elements with a fastener comprising a threaded surface and an adhesive composition at least partially disposed on the threaded surface, the method comprising the steps of: providing the adjacent elements; providing the fastener; and disposing the fastener adjacent and/or through the adjacent elements; wherein the fastener is as set forth in Embodiment 1 or 2.

Embodiment 11 relates to an aqueous adhesive composition for forming a fastener adhesive. The aqueous adhesive composition comprises about 5 to about 95 parts by weight of a microencapsulated epoxy resin comprising at least one of a bisphenol F epoxy resin or a novolac epoxy resin. The aqueous adhesive composition further comprises about 0.5 to about 90 parts by weight of a binder comprising a polymeric amine. The aqueous adhesive composition further comprises about 1 to about 30 parts by weight of a curing agent different from the binder and comprising an amine. The aqueous adhesive composition yet further comprises about 10 to about 90 parts by weight of an aqueous solvent comprising water. Each of the amounts is based on 100 parts by weight of the aqueous adhesive composition.

Embodiment 12 relates to the aqueous adhesive composition as set forth in Embodiment 11, wherein the curing agent comprises 2,4,6-tris(dimethylaminomethyl)phenol; 1,3-Bis[3-(dimethylamino)propyl]urea; or a combination thereof.

Embodiment 13 relates to the aqueous adhesive composition as set forth in Embodiment 11 or 12, wherein the binder is a polyethylenimine.

Embodiment 14 relates to the aqueous adhesive composition as set forth in any one of Embodiments 11 to 13, wherein the microencapsulated epoxy resin is present in an amount of from about 35 to about 45 parts by weight, the binder is present in an amount of from about 5 to about 10 parts by weight, the curing agent is present in an amount of from about 8 to about 12 parts by weight, and the aqueous solvent is present in an amount of from about 25 to about 50 parts by weight.

The individual components of these embodiments are generally as described above. All combinations of the aforementioned embodiments are hereby expressly contemplated.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An aqueous adhesive composition for forming a fastener adhesive, said aqueous adhesive composition comprising:
    about 35 to about 45 parts by weight of a microencapsulated epoxy resin comprising a bisphenol F novolac epoxy resin;
    about 5 to about 10 parts by weight of a binder comprising a polymeric amine;
    about 8 to about 12 parts by weight of a curing agent comprising a tertiary amine, which is different from said binder; and
    about 25 to about 50 parts by weight of an aqueous solvent comprising water;
    each based on 100 parts by weight of said aqueous adhesive composition.

2. The aqueous adhesive composition as set forth in claim 1, wherein said tertiary amine comprises at least one of:
    i) 2,4,6-tris(dimethylaminomethyl)phenol;
    ii) 1,3-Bis[3-(dimethylamino)propyl]urea; and
    iii) dimethylamino(methyl)phenol.

3. The aqueous adhesive composition as set forth in claim 2, wherein said binder comprises a polyethylenimine.

4. The aqueous adhesive composition as set forth in claim 2, wherein said tertiary amine comprises said 2,4,6-tris(dimethylaminomethyl)phenol.

5. The aqueous adhesive composition as set forth in claim 4, wherein said binder comprises a polyethylenimine.

6. The aqueous adhesive composition as set forth in claim 2, wherein said tertiary amine comprises said dimethylamino(methyl)phenol.

7. The aqueous adhesive composition as set forth in claim 6, wherein said binder comprises a polyethylenimine.

8. The aqueous adhesive composition as set forth in claim 2, wherein said tertiary amine comprises said 1,3-Bis[3-(dimethylamino)propyl]urea.

9. The aqueous adhesive composition as set forth in claim 8, wherein said binder comprises a polyethylenimine.

10. The aqueous adhesive composition as set forth in claim 1, wherein said binder comprises a polyethylenimine.

11. The aqueous adhesive composition as set forth in claim 1, further comprising an additive selected from the group consisting of pigments, surfactants, viscosity modifiers, and combinations thereof.

12. An adhesive composition formed by drying the aqueous adhesive composition as set forth in claim 1.

13. An adhesive formed by curing the adhesive composition as set forth in claim 12.

14. An article comprising:
a substrate having a surface; and
an adhesive composition disposed on said surface;
wherein said adhesive composition is as set forth in claim 12.

15. A fastener comprising the article as set forth in claim 14, wherein said substrate surface comprises a threaded surface.

16. The fastener as set forth in claim 15, wherein said substrate is selected from the group consisting of bolts, nuts, screws, studs, stand-offs, plugs/caps, and combinations thereof.

17. An assembly including a fastener, wherein said fastener is as set forth in claim 16 and wherein said adhesive composition is cured to form an adhesive.

18. A method of making an article comprising:
providing a substrate having a surface;
providing an aqueous adhesive composition;
applying the aqueous adhesive composition to the surface of the substrate; and
optionally, drying the aqueous adhesive composition after applying to make the article;
wherein the aqueous adhesive composition is as set forth in claim 1.

* * * * *